Sept. 10, 1940.  P. M. RAIGORODSKY  2,214,678
PROCESS FOR THE RECOVERY OF DESIRABLE CONSTITUENTS FROM GAS
Filed Dec. 10, 1938
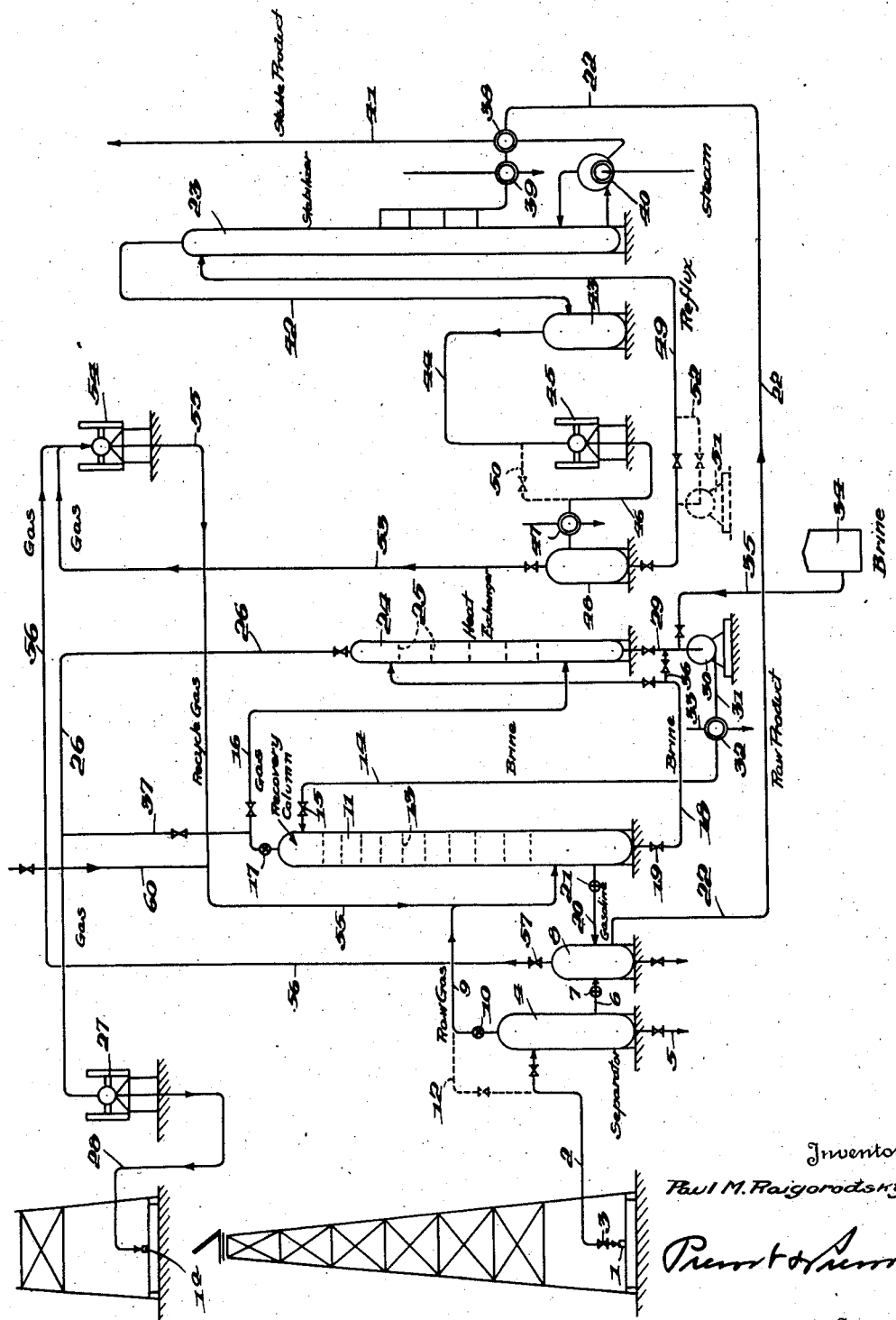

Patented Sept. 10, 1940

2,214,678

UNITED STATES PATENT OFFICE 2,214,678

PROCESS FOR THE RECOVERY OF DESIR-
ABLE CONSTITUENTS FROM GAS

Paul M. Raigorodsky, Tulsa, Okla., assignor to
Petroleum Engineering, Incorporated, Tulsa,
Okla., a corporation of Delaware Application December 10, 1938, Serial No. 245,051

9 Claims. (Cl. 62—175.5)

This invention consists in new and useful improvements in a process for the recovery of desirable hydrocarbon constituents from gas, and relates more particularly to the recovery of condensible hydrocarbon constituents from natural gas which is initially available from wells at high pressures.

In most areas where oil and gas are produced, wastage of gas to the air is prohibited by conservation laws and regulations, and since the volume of gas normally available in most of these areas greatly exceeds any commercial demand therefor, the problem arises of providing a practical process for recovering valuable liquid constituents from such gas, without undue wastage of the residue gas, in order to enable owners of the gas reservoirs to realize revenue from these sources. The only practical systems sanctioned by the conservation statutes and rules permit the production of gas for the recovery of gasoline constituents therefrom, only when the excess gas, not otherwise utilized, is returned to the sub-surface reservoir from which it came originally, or is employed to increase the pressure in other sub-surface strata, such as oil producing strata. Such systems, therefore, involve the steps of producing the gas from a well, extracting the desired constituents therefrom, and returning the residue gas to the sub-surface reservoirs. These systems are generally known as "re-cycling" or "re-pressuring" systems and manifold problems arise in the successful conduct thereof.

Among the principal problems encountered is that of the frequently extremely high pressures existing in the gas reservoirs and other sub-surface strata to which the gas must be returned. These pressures are often well above 1000 pounds per square inch and range upwards therefrom to 2500 pounds or more. In the more conventional gasoline extraction methods, the recovery operations, whereby gasoline constitutents are condensed and separated from the gas, are generally conducted most efficiently at pressures well below 500 pounds per square inch. In the case of gas wells producing gas at 2000 pounds, for example, the recycling systems referred to would involve reduction of the pressure from this initial pressure of 2000 pounds to the extraction pressure, say 300 pounds per square inch, removal of the gasoline constituents, and recompression of the residue gas to a pressure which is substantially above the initial pressure of 2000 pounds, in order to force the gas back into the high pressure sub-surface reservoirs. Obviously, such a system involves a relatively enormous cost for recompression of the residue gas and as a result tends to render uneconomical systems employing conventional gasoline recovery steps. Therefore, it becomes of paramount importance that the desirable gasoline constituents be recovered from the gas at high pressures, which approach as closely as possible the initial pressure of the gas, in order that the cost of recompression of the residue gas and of its subsequent return to the sub-surface reservoirs may be held as low as possible and within economic limits.

It is therefore a principal object of this invention to provide a novel process for the recovery of desirable constituents from high pressure gas while maintaining the pressure of the gas as nearly as possible to its initial pressure.

While this invention is particularly adapted to efficiently recover desirable constituents from high pressure gas, it will be understood that it is equally advantageous when applied to low pressure gases, as will be explained hereinafter.

The process contemplated by this invention comprises, generally, the novel steps of (1) condensing the desirable constituents under rectification conditions by direct heat exchange contact with a low temperature liquid refrigerating medium which is substantially immiscible with the gas and condensed constituents under the conditions of the process; (2) direct contact heat exchange of the cold effluent gases with the incoming refrigeration medium to decrease the cost of refrigeration, to increase the efficiency of the process and to dehydrate the refrigerant; and (3) increasing the concentration of undesirable lighter constituents in the gas prior to the condensing step to thereby increase the recovery of desirable constituents.

With the above and other objects in view which will appear as the description proceeds, my invention resides in the novel features hereinafter set forth, illustrated in the accompanying drawing and more particularly pointed out in the appended claims.

In the accompanying drawing I have diagrammatically illustrated one method of carrying out my invention, and although the following description covers the process as applied to gas which is initially available from the well at a pressure of about 2000 pounds per square inch, it will be understood that said process is applicable with equal efficiency to lower and higher pressure gases.

Referring to the drawing, raw natural gas is drawn from a well 1 through a pipe 2, having a control valve 3 mounted therein, and is introduced into a field separator 4 which is preferably maintained at about 2000 pounds pressure and in which some water and heavy distillate will separate from the gas. The water may be drawn off to waste through a valved drain pipe 5 connected to the bottom of separator 4, and the distillate is discharged from an intermediate portion of separator 4 to an accumulator 8 through a pipe 6 having mounted therein a pressure reducing valve 7. In discharging the gas condensate from separator 4 to accumulator 8, the pressure is reduced to about 400–450 pounds per square inch by suitable manipulation of valve 7.

The raw gas, freed as described of water and heavier portions of distillate, is discharged through a pipe 9 and valve 10 to the lower portion of a rectifying column 11 provided with the usual bubble trays or other conventional liquid-vapor contacting devices 13. Valve 10 is manipulated to hold the desired pressure in separator 4. If desired, separator 4 may be by-passed by the gas, a valved by-pass pipe 12, shown in dotted outline, being provided for this purpose between pipes 2 and 9.

The gas entering the lower portion of column 11 from pipe 9 flows upwardly through the column into direct counter-current contact with a down-flowing stream of a chilled liquid refrigerating medium introduced into the upper portion of column 11 from a pipe 14 under the control of a valve 15. The preferred refrigerating medium is a liquid characterized generally by its immiscibility with the gas and condensed constituents under the conditions of the contact in column 11. The refrigerating medium is also preferably of higher specific gravity than the gas condensates. Suitable refrigerating mediums for use in this process include concentrated calcium- and sodium chloride brines, glycerine, glycols and the like. In this particular example, concentrated calcium chloride solution is employed because of its superior dehydrating qualities.

The brine, chilled to a temperature of about −5° F. to −7° F. in a manner to be described hereinafter, cools the gas throughout the counter-current contact in column 11 to a temperature sufficient to condense the desired constituents of the gas. The rate at which the brine is introduced into column 11 is preferably so controlled that the condensation of the desirable constituents of the gas takes place under substantially true rectification conditions and produces substantially complete stripping of the desirable constituents from the gas. That is, the rate at which the cold brine is introduced into column 11 is so controlled that a maximum amount of lighter constituents, undesirable in the final product, is condensed in column 11, providing a relatively large amount of liquid reflux at low temperatures, whereby maximum amounts of the heavier desirable constituents of the gas are condensed under rectifying conditions to produce a liquid product of comparatively controlled composition and thus stripping the gas substantially completely of these desirable constituents. Thus for example, the cold brine is introduced at such a rate into column 11 as to condense relatively large quantities of the propane which serves as reflux to assure substantially complete condensation of all of the butanes and heavier constituents, which will collect in the lower portion of column 11. While the major portion of the propane will be evaporated in condensing the butanes and heavier, some propane will remain in the liquid product.

By means of the described direct contact of brine with the gas, and by means of the controlled rate of introduction of the brine, the temperature of the uncondensed gas leaving the top of column 11 through a pipe 16 and a valve 17 will approach very closely the temperature of the incoming brine, in the present example, being from −5° to 0° F.

Similarly, the temperature of the brine leaving the bottom of column 11 through a pipe 18 and a valve 19 will closely approach the temperature of the incoming gas; namely, from about 50° F. to 70° F. In this way, a very high heat exchange efficiency is obtained while maintaining efficient rectification conditions in column 11. The pressure of the gas in column 11 is reduced from 2000 pounds to about 1500 pounds by suitable manipulation of valve 17. The reduction in pressure of the gas from 2000 pounds to 1500 pounds produces some cooling of the entering gas to about the temperatures above specified, and thus aids in the condensation operation in column 11. It should be understood, however, that when dealing with lower pressure gases, very little, if any, pressure reduction is effected in column 11, except for such reduction as may be due to the normal pressure drop through the apparatus. It should also be understood that the temperatures employed will vary with the pressures of the gas in each particular case and with the nature of the constituents to be recovered.

The desirable constituents, which are condensed in column 11, collect in the lower portion of the column and since this condensate is of lower specific gravity than the brine solution, it will stratify above the brine and will be discharged from the column, under the high pressure therein, through a pipe 20 and valve 21 into accumulator 8, the pressure on said condensate being reduced by means of valve 21 to the pressure of accumulator 8. The condensed constituents and the distillate from separator 4, which together constitute the raw liquid product of the process, are discharged from accumulator 8 through a pipe 22 to a stabilizing column 23 to be stabilized as will be more fully described hereinafter.

The gas, stripped of desirable constituents, and at a very low temperature, preferably −5° F. to 0° F., is discharged from the upper portion of column 11 through pipe 16 and valve 17 and is introduced into the lower portion of a direct contact heat exchanger 24. The brine solution, having become heated to a temperature of from 50° F. to 70° F. by its previous contact with the gas in column 11, as just described, is discharged from the bottom of column 11 through pipe 18 and valve 19 into the upper portion of the heat exchanger 24, wherein it flows downwardly in direct counter-current contact with the up-flowing stream of cold gas. Suitable liquid-vapor contacting devices, such as bubble trays or baffle plates 25, are positioned within heat exchanger 24 to promote efficient contact of the gas with the brine. The direct contact heat exchange in exchanger 24 results in highly efficient heat transfer between the gas and the brine with the result that the temperature of the brine reaching the bottom of the exchanger will closely approach the inlet temperature of the gas, to wit, 0° F. to −5° F., while the gas leaving the top of the exchanger will have a temperature of from 40° F. to 60° F. At this temperature, the formation of hydrates in the gas leaving the exchanger will be largely avoided.

In addition to the heat exchange accomplished in exchanger 24, another important result is accomplished; namely, the reconcentration of the brine solution. In the original contact of gas and brine in column 11, the brine will absorb water vapor which is normally contained in the gas. At the same time, the gas leaving the column will be saturated with water vapor at its exit temperature of −5° F. to 0° F. When this cold gas is heated in exchanger 24 by contact with the warm brine solution, the gas will absorb from the brine additional water vapor sufficient to saturate the gas at 40° F. to 60° F., its temperature of exit from exchanger 24. Under the controlled temperature and pressure conditions in exchanger 24, sufficient water will thus be transferred from the brine to the gas to re-concentrate the brine to substantially its original concentration, thereby largely eliminating any necessity for an extraneous reconcentration system for the brine. The pressure in exchanger 24 is maintained at substantially the same pressure as in column 11, any decrease in pressure which may occur resulting primarily from the pressure drop in pipe 16 and exchanger 24.

After the afore-described heat exchange step in exchanger 24, the gas is discharged therefrom through a pipe 26 to a compressor 27 wherein said gas is re-compressed to a pressure of about 2600 pounds for return through a pipe 28 to a second well 1a which extends to the same sub-surface reservoir from which the gas was originally produced. However, instead of returning the gas to the same reservoir, it may be returned to a lower pressure stratum, in which case no re-compression may be necessary. Or the gas may be utilized for any other suitable purpose.

The brine solution which has been cooled to a temperature of from 0° F. to −5° F. by the direct heat exchange step in exchanger 24, is discharged therefrom through a pipe 29 to a pump 30 which discharges the brine through a pipe 31 which conveys the brine through a chiller 32, where the temperature is further reduced to that required in column 11, in this example, to −5° F. to −7° F., and thence into pipe 14 for introduction into the upper portion of column 11 as previously described. A chilling medium such as expanded ammonia, propane, or any other suitable chilling medium, is passed through chiller 32 by means of a pipe 33 for the purpose of chilling the brine to the desired temperature. Additional brine solution, when required, may be supplied to the brine circulation system from a brine supply tank 34 which is connected by a valve pipe 35 to pipe 29 on the suction side of pump 30.

In some instances it may be desirable to eliminate heat exchanger 24 from the system and circulate the brine directly from the bottom of column 11 to the top thereof. In such cases, a by-pass connection 36 is provided between pipes 18 and 29 together with suitable valves in these pipes whereby the brine is conducted through pipes 18, 36, 29, pump 30, pipe 31, chiller 32, and pipe 14 into the top of column 11. Similarly, the gas leaving the top of column 11 may be sent directly from pipe 16 to pipe 26 by providing suitable valves and a by-pass pipe 37 between these pipes.

Returning now to the condensed product of the process, which is collected in accumulator 8, as previously described, and transferred therefrom through pipe 22 to a conventional stabilizer 23.

The raw product collected in accumulator 8 contains all of the desirable butanes and heavier constituents of the gas together with some propane and lighter hydrocarbons. This raw product passes from pipe 22 through a heat exchanger 38 and a heater 39 before entering a selected intermediate portion of the stabilizer 23 where it is rectified in the conventional manner by the usual refluxing operation to eliminate therefrom the undesirable constituents. These undesirable constituents usually comprise the propane and lighter products but sometimes include part or all of the butane.

The stabilized product is withdrawn from the bottom of stabilizer 23, stripped of its remaining light ends in a reboiler 40, and discharged to storage through a pipe 41 which passes through heat exchanger 38 in order to partially preheat the raw product going to the stabilizer. The gaseous components, such as propane or butane and lighter as the case may be, which are separated from the stabilized product in stabilizer 23, are discharged from the upper portion thereof through a pipe 42 to a separator 43, thence through a pipe 44 to a compressor 45, which compresses the gas from the stabilizer pressure 100 to 150 pounds, in this case, to a pressure of 400 to 450 pounds, and discharges the compressed gas through a pipe 46 and into a reflux condenser 47, where at least part of the gas is condensed to provide liquid reflux for stabilizer 23. The mixture of gas and liquid from condenser 47 is discharged into a reflux accumulator 48 where the liquid condensate is separated from uncondensed gas and discharged under the pressure in accumulator 48 through a pipe 49 to the upper portion of stabilizer 23.

The primary purpose of compressor 45 is to assure a sufficient supply of liquid reflux for the stabilizer. Where the gaseous product from the top of the stabilizer contains sufficient heavy fractions which will condense without increase in pressure, the compressor 45 may be by-passed by providing a by-pass connection 50, together with the valves necessary to accomplish this purpose. Under these conditions, the pressure in accumulator 48 will be insufficient to force liquid back to the top of the stabilizer and a pump 51 arranged in a by-pass pipe 52, shown in dotted outlines, is provided to meet this contingency.

The gaseous components separated from reflux condensate in accumulator 48 will consist, ordinarily, largely of propane and lighter components, and are discharged from accumulator 48 through a pipe 53 to a compressor 54 which compresses these gaseous materials to a pressure of about 1500 pounds and discharges the compressed gas through a pipe 55 into pipe 9 where it is mixed with the raw gas going to column 11. By thus returning the lighter undesirable constituents, such as propane and lighter, to the raw gas entering column 11, the concentration of these undesirable lighter constituents in the raw gas is increased over its normal content of such constituents, with the result that when the mixed gas is cooled in column 11, as previously described, the added lighter constituents increase the partial pressure of these constituents in the gas and will result in increased condensation of the desirable constituents from the gas; that is, the butane and heavier constituents, and thereby greatly increase the efficiency of the recovery operation.

The term "undesirable lighter constituents," wherever used herein, should be understood to mean those lighter hydrocarbons which are undesirable in any particular liquid product but which are condensible under the conditions of the rectification-condensing operation in column 11. Generally, such hydrocarbons are the propane and some smaller amounts of ethane which may condense under the high pressure-low temperature conditions ordinarily employed, but may include, under some conditions, all or part of the butanes, depending upon the quantity of butanes which it may be desired to retain in the final product.

Gases vented from the raw liquid product in accumulator 8 as a result of the reduction in pressure, also will consist largely of undesirable lighter constituents which were originally condensed in column 11, and these are discharged from accumulator 8 through a pipe 56 and valve 57 to the suction of compressor 54, where they are mixed with the lighter undesirable constituents from pipe 53 and returned to the raw gas stream in pipe 9 to thereby further increase the concentration of condensible undesirable constituents in the raw gas for the purposes above described.

Instead of increasing the concentration of undesirable lighter constituents in the raw gas by means of such constituents which are produced in the process, the desired increase in concentration may be effected by introducing undesirable lighter constituents which are condensible in column 11 from an extraneous source. For this purpose, a pipe 60 is connected to pipe 55. In every case, the added constituents will be such as will increase the recovery of desirable constituents. For example, if it is desired to increase the recovery of butanes and heavier in column 11, the undesirable constituents added to the gas should consist largely of propane. If a comparatively butane-free product is desired, the added constituents should consist largely of butanes.

From the foregoing, it is believed that the operation and advantages of my invention may be readily understood by those skilled in the art without further description, it being borne in mind that numerous changes may be made in the details disclosed without departing from the spirit of my invention as set out in the following claims.

What I claim and desire to secure by Letters Patent is:

1. The process of recovering desirable constituents from gas, which comprises subjecting raw gas to direct contact under rectification conditions with an immiscible liquid refrigerant at a low temperature to condense said desirable constituents, separating the resulting condensate from uncondensed gas and from said refrigerant, cooling said refrigerant to said low temperature and returning the same to contact with fresh raw gas, and increasing the normal concentration of undesirable lighter constituents in said raw gas by adding thereto additional quantities of undesirable lighter constituents.

2. The process of recovering desirable constituents from gas, which comprises subjecting raw gas to direct contact under rectification conditions with an immiscible liquid refrigerant at a low temperature to produce a condensed product containing said desirable constituents together with undesirable lighter constituents, separating said product from uncondensed gas and from said refrigerant, cooling said refrigerant to said low temperature and returning the same to contact with fresh raw gas, separating from said product said undesirable lighter constituents, and returning the latter to the stream of said raw gas.

3. The process of recovering desirable constituents from gas, which comprises subjecting raw gas to direct contact under rectification conditions with an immiscible liquid refrigerant at a low temperature, to condense said desirable constituents, separating the resulting condensate from uncondensed gas and from said refrigerant, re-contacting said uncondensed gas directly with said refrigerant to partially cool the latter, additionally cooling the refrigerant to said low temperature and returning the same to contact with fresh raw gas, and increasing the normal concentration of undesirable lighter constituents in said raw gas by adding thereto additional quantities of undesirable lighter constituents.

4. The process of recovering desirable constituents from gas, which comprises subjecting raw gas to direct contact under rectification conditions with an immiscible liquid refrigerant at a low temperature, to thereby produce a condensed product containing said desirable constituents together with undesirable lighter constituents, separating said condensed product from uncondensed gas and from said refrigerant, re-contacting said uncondensed gas directly with said refrigerant to partially cool the latter, additionally cooling said refrigerant to said low temperature and returning the same to contact with fresh raw gas, separating from said product said undesirable lighter constituents, and returning the same to the stream of said raw gas.

5. The process of recovering desirable constituents from gas fed from a natural pressure source in excess of 1000 pounds per square inch, comprising subjecting the raw gas to direct contact solely with an immiscible liquid refrigerant at a low temperature in a rectifying zone without substantial drop in pressure, to condense said desirable constituents, separating said condensate from uncondensed gas and from said refrigerant, withdrawing the condensate, re-contacting said refrigerant with said uncondensed gas to partially cool said refrigerant, additionally cooling said refrigerant to said low temperature and returning the same to said rectifying zone for contact with fresh raw gas.

6. The process of recovering desirable constituents from gas fed from a pressure source comprising subjecting the raw gas to direct contact with an immiscible liquid refrigerant at a low temperature in a rectifying zone under substantially maintained pressure, to condense a product including said desirable constituents and undesirable lighter constituents, separating said condensed product from uncondensed gas and from said refrigerant, cooling said refrigerant to said low temperature and returning the same to said rectifying zone for contact with fresh raw gas, separating the desirable constituents from undesirable lighter constituents, and withdrawing the desirable constituents, returning the undesirable lighter constituents to said rectifying zone admixed with fresh raw gas.

7. The process of recovering desirable constituents from gas fed from a pressure source, comprising subjecting the raw gas to direct contact with an immiscible liquid refrigerant at a low temperature in a rectifying zone under substantially maintained pressure, to condense a product including said desirable constituents and undesirable lighter constituents, separating said condensed product from uncondensed gas and from said refrigerant, cooling said refrigerant to said low temperature and returning the same to said rectifying zone for contact with fresh raw gas, separating the desirable constituents from undesirable lighter constituents at a reduced pressure, withdrawing the desirable constituents, recompressing the undesirable lighter constituents and returning the same to said rectifying zone admixed with fresh raw gas.

8. The process of recovering gasoline-like constituents from natural gas existing under pressure in gas producing formations, while conserving the gas and maintaining its pressure, consisting in subjecting the raw gas to direct contact with an immiscible liquid refrigerant at a low temperature in a rectifying zone under substantially maintained pressure, to condense said gasoline-like constituents, separating said condensate from uncondensed gas and from said refrigerant, withdrawing the condensate, cooling said refrigerant to said low temperature and returning the same to said rectifying zone for contact with fresh raw gas, and increasing the normal concentration of undesirable lighter constituents in said raw gas by adding thereto additional quantities of undesirable lighter constituents.

9. The process of recovering desirable constituents from natural gas existing under pressure in gas producing formations, while conserving the gas and maintaining its pressure, which comprises flowing said gas from said producing formation under its natural pressure, contacting said gas with an immiscible liquid refrigerant at a low temperature in a rectifying zone under substantially maintained pressure, to condense a product including said desirable constituents and undesirable lighter constituents, separating said condensate from uncondensed gas and from said refrigerant, re-contacting said refrigerant directly with said uncondensed gas while under substantially maintained pressure, to partially cool said refrigerant, additionally cooling said refrigerant to said low temperature and returning the same to said rectifying zone for contact with fresh raw gas, separating the desirable constituents from said undesirable lighter constituents in a zone of reduced pressure, stabilizing said desirable constituents, compressing said undesirable lighter constituents, and returning the same to said rectifying zone admixed with fresh raw gas.

PAUL M. RAIGORODSKY.